United States Patent [19]

Torres-Cardona et al.

[11] Patent Number: 5,236,677
[45] Date of Patent: Aug. 17, 1993

[54] BIOLOGICAL PROCESS FOR THE ELIMINATION OF SULPHUR COMPOUNDS PRESENT IN GAS MIXTURES

[75] Inventors: Mario D. Torres-Cardona, Nuevo Leon; Sergio Revah-Moiseev, Virreyes; Antonio Hinojosa-Martinez, Nuevo Leon; Fernando J. Paez-Moreno, Mexico Leon; Victor M. Morales-Baca, Nuevo Leon, all of Mexico

[73] Assignee: Grupo Cydsa S.A. de C.V., Garza Garcia, Mexico

[21] Appl. No.: 852,076

[22] Filed: Mar. 13, 1992

[51] Int. Cl.$^5$ .................. B01D 53/34; C01B 17/16
[52] U.S. Cl. .................. 423/230; 423/220; 423/224; 423/244.02; 423/571; 423/573.1; 423/DIG. 17; 435/168
[58] Field of Search .......... 55/73; 423/230, DIG. 17, 423/573.1, 220, 224, 244.02; 210/611, 615; 435/168

[56] References Cited

U.S. PATENT DOCUMENTS

| | | | |
|---|---|---|---|
| 1,701,825 | 2/1929 | Seil | 423/244 |
| 4,009,251 | 2/1977 | Meuly | 423/573 |
| 4,482,524 | 11/1984 | Hardison | 422/170 |
| 4,622,212 | 11/1986 | McManus | 423/226 |
| 4,931,262 | 6/1990 | Sonta et al. | 423/220 |
| 4,968,622 | 11/1990 | Berzaczy | 435/266 |

FOREIGN PATENT DOCUMENTS

| | | | |
|---|---|---|---|
| 2331367 | 11/1976 | France. | |
| 1-266835 | 10/1989 | Japan | 423/244 |
| 2-126916 | 5/1990 | Japan | 423/230 |
| 3-161018 | 7/1991 | Japan | 423/DIG. 17 |
| 3-161019 | 7/1991 | Japan | 423/230 |

Primary Examiner—Michael Lewis
Assistant Examiner—Peter T. DiMauro
Attorney, Agent, or Firm—Shlesinger Arkwright & Garvey

[57] ABSTRACT

A continuous process for the microbiological conversion and removal of malodorous sulphur-containing organic and inorganic compounds from a gaseous stream, comprising the steps of providing a column filled with packing material. Passing a biologically active liquid stream containing nutrients and a consortia of bacteria including microorganisms of the Thiobacillaceae family through the column whereby the bacteria are immobilized onto all available surface area of the packing material. Maintaining the temperature conditions within the column between about 5° C. to about 47° C. and the pH conditions between about 5 to about 9. Concurrently passing a gaseous stream containing the malodorous sulphur-containing organic and inorganic compounds through the column at a liquid gas ratio of about 3:7 for a sufficient period of time to allow the bacteria to convert greater than about 97% of the sulphur compounds within the gaseous stream into a useful form of elemental sulphur.

14 Claims, 3 Drawing Sheets

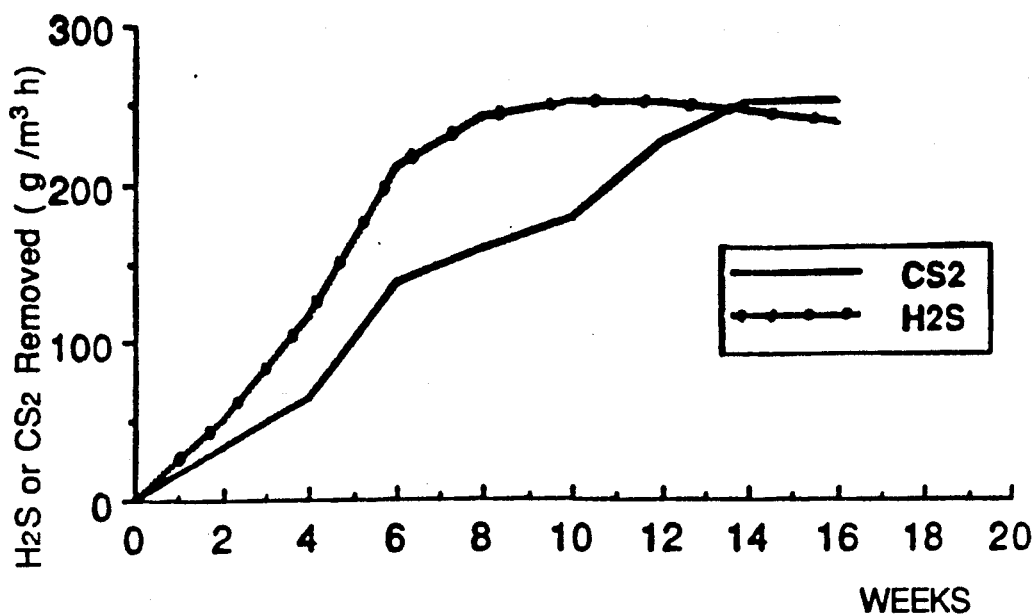
FIG. 3 - Volumetric remotion of H2S and CS2
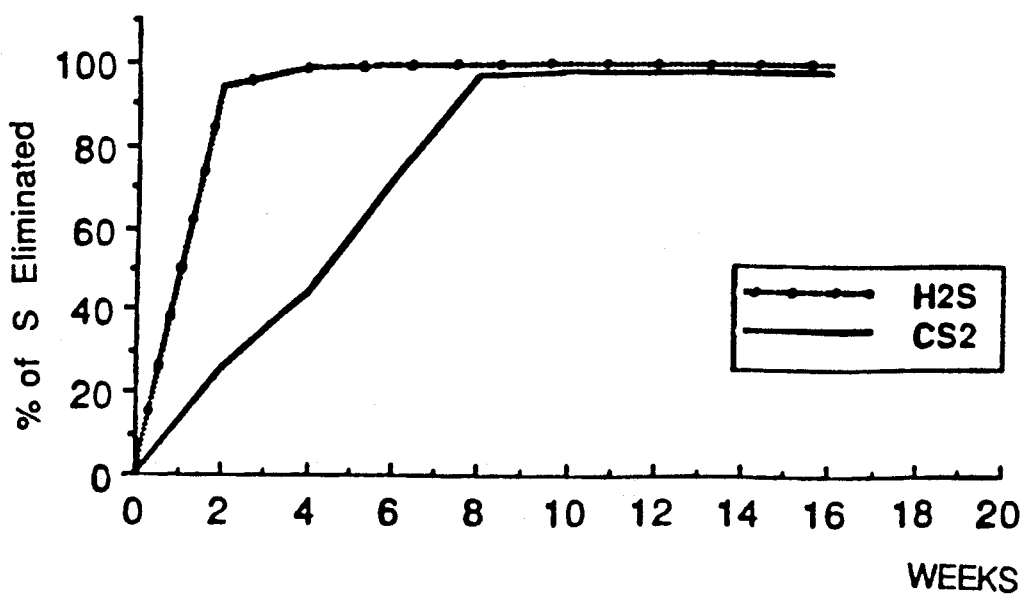
FIG. 4 - H2S and CS2 Removed (%)

BIOLOGICAL PROCESS FOR THE ELIMINATION OF SULPHUR COMPOUNDS PRESENT IN GAS MIXTURES

SUMMARY OF THE INVENTION

This invention is related to the elimination of odoriferous sulphur compounds in various gas streams. Such compounds may be organic or inorganic.

This new process for the purification of process or residual gases consists of feeding the gas that contains one or more sulphur compounds through an absorption column. This column is equipped with packing which is used to support the microbial cultures. The bacteria are immobilized to form a biological film throughout the packed bed.

One or more malodorous compounds contained in the gas enter the bioscrubber and are absorbed into an activated nutrient solution, which flows countercurrently. In the aqueous phase the microorganisms that form the biofilm, catch the sulphur compounds and transform them into other nonvolatile substances.

With this process it is possible to prepare a culture of highly efficient microorganisms to metabolize hydrosulphuric acid, carbon disulphide and other compounds that contain sulphur to elemental sulphur and sulphate ions, by extracting them from activated sludge collected from sewage treatment plants and the environs of places where residual gases are emitted.

The bioscrubber is inoculated with the aforementioned sludge along with a nutrient broth and sufficient aeration to promote the growth of some species of aerobic microorganisms such as Thiobacillus.

Without being limited to the particulars of the patent, the process described here is specially useful and economic for the treatment of gas streams derived from the regeneration of viscose, containing up to 7000 ppm. of hydrosulphuric acid and up to 3000 ppm. of carbon disulphide in a matrix of air saturated with water vapor. The traditional purification methods for these types of gases are too expensive and less efficient, since the sulphur compounds are separated from the effluent gas individually, and in general the problem of pollution is transferred from the air to water and soil.

BACKGROUND OF THE INVENTION

The odor generated by the presence of sulphur compounds in effluent gases has been a problem for a long time. Many different methods, all based on chemical and physicochemical properties derived from sulphur, have been used to solve this problem. Usually, some type of absorption system has been used, based on activated carbon that has been treated with some alkaline or other material that in some way increases the absorption of the polluting agent. Moreover, the chemical oxidation systems involved in the cleansing of gas streams which contain one or more malodorous compounds, have been another possible solution to this problem. Therefore, oxidizing agents have been used, such as sodium hydroxide, sodium hypochlorite and some others on a smaller scale, to cleanse odoriferous streams.

More recently, Meuly, U.S. Pat. No. 4,009,251 in 1977, Hardison, U.S. Pat. No. 4,482,524 in 1984 and McManus, U.S. Pat. No. 4,622,212 in 1986 have used chelated iron to solve the problem of odor generated by $H_2S$, in which the oxygen in the gas stream is used as an oxidizing agent in a catalytic system that self-regenerates and leaves elemental sulphur as a final product.

Various attempts have also been made to solve the problem of the polluted emissions from viscose plants, which contain $H_2S$ and $CS_2$ in humid air. $H_2S$ can be absorbed in activated carbon impregnated with potassium iodide, while $CS_2$ can be absorbed by fine porous, activated carbon. The $H_2SO_4$ that is formed is washed away with water and the $CS_2$ is dissipated with water vapor. Another option is to use activated carbon with a low heavy metal content in order to oxidize the $H_2S$, and the resulting $H_2SO_4$ is neutralized with $NH_3$. Nevertheless, it must be noted that these methods are not very appealing for treating large quantities of polluted air that contain relatively low concentrations of the pollutants due to their low efficiency and operating costs. Another alternative for eliminating part of the carbon disulphide from effluent gases, consists of freezing them to a temperature of $-0°$ C., in order to condense part of the carbon disulphide. Once the carbon disulphide is partially removed, the gas is sent to a burner.

Although the technologies that use activated carbon solved the problem of removing a large quantity of pollutants efficiently, the carbon regeneration process is not economical. Besides, the regenerated material does not have the same efficiency as the original material. Moreover, there was still the problem of disposing of the spent carbon. On the other hand, when you cleanse polluted air streams with oxidizing agents or when you use catalytic systems with chelated iron, the operating costs are always significant, mainly due to the consumption of chemical products. If you decide to burn the sulphur compounds, you then have the problem of disposing of the sulphur dioxide.

One or more of the aforementioned methods can be used to solve the problem of odors caused by sulphur compounds, however the operating cost is not very appealing, and in many cases, as has already been demonstrated, the solution to the problem is not definitive, since they generate other types of controversial waste.

A more interesting alternative in recent years has been under development, using biological systems to control emissions into the atmosphere and to treat process gas. These systems have the advantage of offering a final solution for many air pollution problems, as well as also eliminating all sulphur compounds in one single step. They promote biochemical oxidation from sulphur compounds to nonvolatile products by using the life cycles of some sulphoxidizing bacteria, thus resulting in much more economical processes.

For example, Berzaczy et al., in U.S. Pat. No. 4,968,622 in 1990, described a biological process for the elimination of sulphur compounds from a gas stream, obtaining sulphate liquor as a final product. Likewise, in French patent No. 2,331,367, applied for 1976 and assigned to Courtaulds, Ltd., reference is made to certain laboratory studies and a mini-pilot program for a biotechnological process for the elimination of $H_2S$ from a gas stream, and obtaining a mixture of sulphur and sulphate as a final product.

In our process, you do not have the inconvenience, presented in the previously reported studies, of turning the pollution into another problem, that is turning the sulphur compounds in gas streams into sulphate liquor in another phase. The biotechnological process reported in this paper, eliminates sulphur compounds from a gas stream, and basically transforms them into inoculated sulphur, which has proven to be a valuable product such as an soil enhancer. Another advantage of this invention is that it very efficiently eliminates sulphur compounds.

Brief Description of the Drawings

FIG. 3 is a graph illustrating the volumetric remotion of $H_2S$ and $CS_2$ according to the present invention.

FIG. 4 is a graph illustrating the percent removal of $H_2S$ and $CS_2$ according to the present invention.

GENERAL DESCRIPTION OF THE PROCESS

Figure 1:
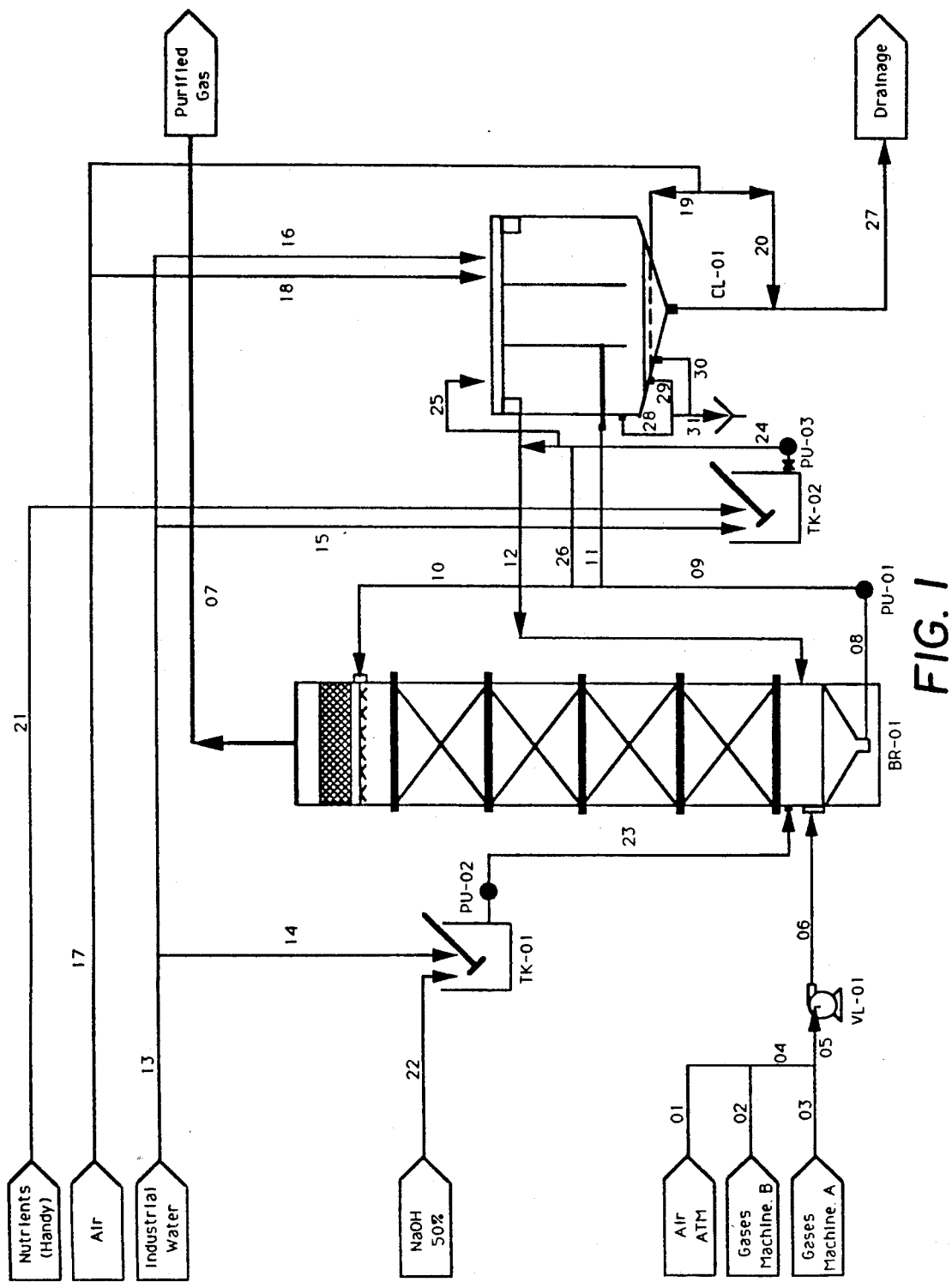
FIG. 1 is a schematic diagram outlining the overall process according to the present invention.

As shown in FIG. 1, bioabsorption of the sulphur compound pollutants from the air stream takes place in the BR-OI packed column. This column is fed through line 06, by using a VL-OI extractor, which suctions air from three different sources, the concentrations of which, both of $H_2S$ as well as $CS_2$, are variable Through line 02, air with low pollutant levels is extracted and through line 03 air with high levels is extracted. Line 01 provides only atmospheric air with which mixtures of specific concentrations are prepared. The former step is possible, using the compounds available in the lines described above. It is possible to obtain mixtures containing 5 to 7000 ppm of $H_2S$, and 5 to 3000 ppm of $CS_2$.

The base of the column has a collector in which a certain level of bioliquor is kept, from 5% to 75% of its capacity. This solution comes through the packed bed, countercurrent to the entering gas, and accumulates in the aforementioned receptacle. In this collector the pH adjustment of the liquor takes place. The pH level can be kept between 5 and 9, and preferably between 7 and 8. Neutralization occurs by using a diluted caustic soda, which is fed into the collector through line 23. The soda is prepared in a TK-01 receiver with highly concentrated soda, which is provided through line 22, and regular water provided through line 14. You may use caustic soda with 2% to 20% concentration, by weight. You may also use the following alternatives in the neutralization process: ammonia, lime, calcium hydroxide, carbonate of soda, bicarbonate of soda, individually or mixed, or any other neutralizing agent The regulated pH solution is transferred through line 08 with pump PU-OI and sent to the top of the column through line 09 and 10. A distributor, consisting of various nozzles, is in the dome. Here, the liquid is sprayed evenly over the biological packing in such a way that it provides the humidity required both for the bioabsorption of the pollutants, as well as the necessary flux to remove the metabolites generated by the microorganisms that are immobilized in the packing, and thus prevent possible inhibitors.

Figure 2A:
FIG. 2 illustrates the packing material according to the present invention.
Figure 2B:
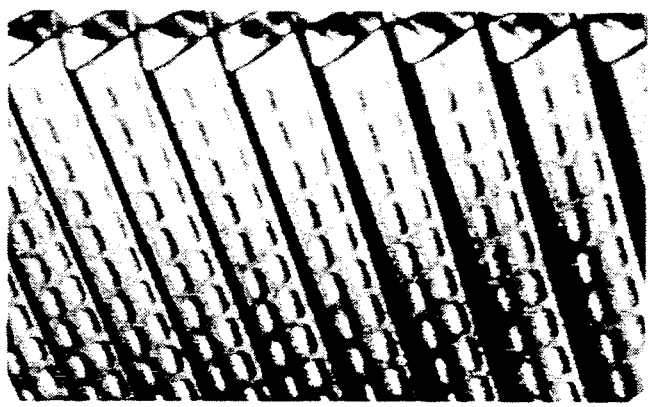

Optimum operation of the column is achieved when the mass values for L/G is 3 to 7. You will see negligible drops in pressure given the characteristics of the packing, which is illustrated in FIG. 2 and is an essential element in the process.

Above the distributor is a mist eliminator that prevents the expulsion of particles and larger quantities of mist into the atmosphere. This piece of equipment consists of the same material as the packing and may be made from PVC, CPVC, polypropilene and other plastic materials. Above the mist eliminator there is a small stack through which the purified air passes out into the atmosphere, shown in FIG. 1 as line 07. This air leaves basically free of $H_2S$ and $CS_2$, if up to 7000 ppm of hydrosulphuric acid and 3000 ppm of carbon disulphide have been used.

As a result of the metabolism of the sulphoxidizing bacteria, basic elemental sulphur and to a lesser degree some sulphates are generated. These materials are carried along in the biological solution to the collector and become part of the bioliquor. Although this liquid is recirculated to the top of the column, usually part of it is sent through line 08 and with the use of pump PU-OI through lines 09 and 11 to the CL-OI clarifier, also shown in FIG. 1. In this piece of equipment the elemental sulphur is deposited and collected at its base through line 27. This piece of equipment has two auxiliary lines, 19 and 20, in order to supply supplementary oxygen in the case of an emergency. Air is also pulsated through these lines to prevent occlusions in the base of the clarifier. Line 18 also provides supplementary air in the case of an emergency and if the settler has to be used as a reactor for activated sludge, i.e. if the absorption column is stopped. By using lines 28, 29, 30 and 31 you can obtain and examine samples of the sludge from various areas of the settler.

The time that the material remains in the settler varies from 15 minutes to two hours. The clarifier has a spillway through which the liquid, free suspended solid, goes. From there it returns to the collector in the absorption column through line 12, and then is recirculated towards the dome of the packed tower. The sludge obtained in the CL-OI settler mainly contains elemental sulphur, minimal amounts of sulphate, traces of some micronutrients and biomass and industrial water. This residue is a valuable product that can be used as a soil enhancer. Through line 16, make-up water is added to the settler.

Usually the water used comes from the secondary clarifier of a municipal water treatment plant. Its essential that the water used in the biosystem does not have any chlorine or any other compound that inhibits or prevents bacterial growth. Water of the same quality can also be used to prepare the additional nutrient mixture in the TK-02, and which can be added through line 15. This nutrient solution is essential for maintaining the life cycle of the microorganisms that belong mainly to the Thiobacillaceae family, and for their continuous and highly efficient functioning. This additive is loaded into the clarifier through line 25 and into the packed column through line 26.

Due to the characteristics of this process, the bacteria remain immobilized in the biological cover that is formed on the surface of the packing for this purpose. The malodorous gas compounds containing sulphur are transferred to an aqueous phase in which they are caught by a microorganism and ingested through its cellular wall. Once they are metabolized, the bacteria excrete elemental sulphur and sulphates among other products as a result of its biochemical processes. These compounds are carried in the aqueous phase to the settler where they are finally removed. It's important to note that the microbic population in the liquor is very slight compared to that which is immobilized in the biofilm.

This continuous process of generating elemental sulphur from odoriferous gas compounds must be accompanied by a continuous supply of the elements needed by the bacteria to best carry out the desired bioxidation. Therefore the following formula is essential if this process is to be feasible: NaCl, 2 to 6 g/l; NH$_4$Cl, 0.01 to 0.2 g/l; K$_2$HPO$_4$, 1 to 5 g/l; MgCl$_2$.6H$_2$O, 0.001 to 0.02 g/l. Moreover, traces of some essential metals are also added, such as iron, cobalt, nickel, manganese, copper, etc.

This process works well at temperatures ranging from 5° up to 47° C., but preferably between 25° and 35° C. Although bioxidation essentially works at the room temperature of the gas stream, the optimum temperature is between 25° and 30° C.

The experimental bioscrubber used in this process has an area of 1.50 m2. The height of the packing may vary from 1.20 m. to 4.80 m. Some of the results that have been obtained are illustrated in Table 1, but only as an example, and should by no means be seen as the limits of the invention's scope.

TABLE 1

TYPICAL EXPERIMENTAL RESULTS OBTAINED IN THE ELIMINATION OF HYDROSULPHURIC ACID AND CARBON DISULPHIDE

| Residual Gas (m3/h) | Concentration Input (ppm) | | Concentration Output (ppm) | | % Removed | |
|---|---|---|---|---|---|---|
| | H$_2$S | CS$_2$ | H$_2$S | CS$_2$ | H$_2$S | CS$_2$ |
| 500 | 1700 | 300 | n.d. | 27 | 100 | 91 |
| 750 | 1500 | 300 | n.d. | 15 | 100 | 95 |
| 1000 | 1600 | 400 | n.d. | 20 | 100 | 95 |
| 1250 | 1100 | 200 | n.d. | | 100 | 100 |
| 1500 | 1500 | 250 | n.d. | 10 | 100 | 96 |
| 1750 | 1200 | 350 | n.d. | 18 | 100 | 95 |
| 2000 | 1050 | 250 | n.d. | | 100 | 100 |
| 2500 | 1700 | 200 | n.d. | 20 | 100 | 90 |
| 3000 | 1100 | 600 | n.d. | 40 | 100 | 93 |

(*) Not detectable

In each of these cases, the conversion to elemental sulphur is greater than 97%, and it is separated in the settler as inoculated sulphur also containing biomass, sulphates and other minor components.

It has also been demonstrated that when you use other sustrates such as COS, thiols, mercaptan, thiophens or thioethers, individually or in mixtures, in this process, you achieve elimination results for CS$_2$ and H$_2$S similar to those demonstrated.

FIGS. 3 and 4 illustrate the process by which the H$_2$S and CS$_2$ are consumed in the experimental bioscrubber that functions as described above. As you see, the efficiency of elimination increases for both gases over time. This period corresponds to the adaptation of the microorganisms to the conditions in the reactor and the colonization of the support. Likewise you will note that the H$_2$S adapts more quickly. This behavior is normal since the H$_2$S is a compound more commonly found in nature than CS$_2$. Moreover, the physical conditions of the process, especially the absorption in the liquid phase, allows the H$_2$S to adapt more quickly.

NOVELTY OF THE INVENTION

Having described the invention, and it being considered a novelty, the factors set forth in the following statements are claimed as property:

We claim:

1. A continuous process for the microbiological conversion and removal of malodorous sulphur-containing organic and inorganic compounds from a gaseous stream, comprising the steps of:
    a) providing a column filled with packing material;
    b) passing a biologically active liquid stream containing nutrients and bacteria comprising microorganisms of the Thiobacillaceae family through the column whereby the bacteria are immobilized onto all available surface area of the packing material;
    c) maintaining the temperature conditions in the column between about 5° C. to about 47° C. and pH conditions between about 5 to about 9; and
    d) concurrently passing a gaseous stream containing the malodorous sulphur-containing organic and inorganic compounds at a liquid/gas mass ratio of about 3:7 for a sufficient period of time so as to allow the bacteria to excrete converted sulphur compounds and recover said converted sulphur compounds as elemental sulphur from the liquid, wherein the excreted and recovered elemental sulphur is in an amount greater than about 97% of said converted sulphur compounds.

2. A process as in claim 1 and further including the step of:
    a) collecting the elemental sulphur within the liquid at the base of the column for removal therefrom.

3. A process as in claim 1 and wherein:
    a) passing the gaseous stream through the column countercurrent to the liquid stream.

4. A process as in claim 1 and wherein:
    a) passing the gaseous stream through the column parallel to the liquid stream.

5. A process as in claim 1 and wherein:
    a) passing the gaseous stream through the column in a crossed flow to the liquid stream.

6. A process as in claim 2 and further including the step of:
    a) neutralizing the liquid collected at the base of the column with a compound selected from the group consisting of caustic soda, ammonia, carbonate soda, bicarbonate soda, lime and mixtures thereof.

7. A process as in claim 6 and further including the step of:
    a) collecting a portion of the neutralized liquid; and
    b) spraying the collected neutralized liquid into the top of the column to recycle the same.

8. A process as in claim 1 and wherein:
    a) the malodorous sulphur-containing organic and inorganic compounds include H$_2$S, CS$_2$, COS, mercaptans, thioalcohols, thioethers, thiphenes and mixtures thereof.

9. A process as in claim 7 and further including the steps of:
    a) clarifying a portion of the recycled liquid within a clarifier to extract the elemental sulphur.
    b) returning the clarified liquid back into the column; and
    c) filtering and drying the collected elemental sulphur.

10. A process as in claim 2 and further including the step of:
    a) continually adding to the column additional nutrient wherein the nutrient comprises a mixture of ingredients selected from the group consisting of K$_2$HPO$_4$, KHPO$_4$, NaCl, NH$_4$Cl, MgCl$_2$, iron salts, nickel salts, copper salts and cobalt salts.

11. A process as in claim 2 and wherein:
    a) the bacteria is immobilized onto packing material selected from the group consisting of PVC, CPVC, polypropylene, polyethylene and other plastic materials.

12. A process as in claim 2 and wherein:
    a) the packing material within the column is structured packing material.

13. A process as in claim 2 and further including the step of:
   a) obtaining the biologically active liquid stream from a secondary clarifier of a water treatment process which does not contain a compound which can inhibit or prevent bacterial growth.

14. A process as in claim 2 and further including the step of:
   a) obtaining the biologically active liquid stream from a waste stream of a viscose fiber manufacturing process.

* * * * *